Patented July 12, 1949

2,475,929

UNITED STATES PATENT OFFICE 2,475,929

N-ALLYL-2-PYRIDONE-5-CARBOXYLIC ACID

Lewis A. Walter, East Orange, N. J., assignor to The Maltbie Chemical Company, Newark, N. J., a corporation of New Jersey No Drawing. Application August 1, 1947, Serial No. 765,625

1 Claim. (Cl. 260—297)

My invention relates to a new and useful composition of matter, namely, N-allyl-2-pyridone-5-carboxylic acid. This novel compound has the following structural formula:

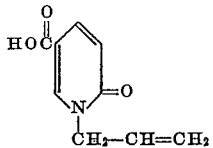

It is a white crystalline solid, having a melting point of 152–153° C. uncorrected.

This compound is useful as an intermediate in the preparation of certain therapeutically useful compounds.

One method of preparation of this novel compound which has been successfully performed is as follows:

Two hundred-ninety grams of methyl coumalinate was suspended in 750 ml. of alcohol and stirred in an ice bath while 250 ml. of allylamine was slowly added. The mixture was then stirred for twenty minutes at room temperature. A solution of 400 g. of potassium hydroxide in 1200 ml. of water was next added and the solution was refluxed vigorously for twenty minutes, then cooled and immediately acidified to Congo red with concentrated hydrochloric acid. On cooling potassium chloride and the N-allyl-2-pyridone-5-carboxylic acid precipitated and was filtered off. This mixture was recrystallized from water with the use of a little charcoal, to give white crystals of N-allyl-2-pyridone-5-carboxylic acid, of M. P. 152–153° C. uncorrected.

What I claim is:

As a novel and useful composition of matter, the chemical compound, N-allyl-2-pyridone-5-carboxylic acid having the structural formula:

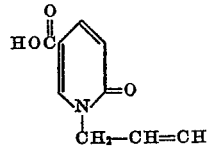

LEWIS A. WALTER.

REFERENCES CITED

The following references are of record in the file of this patent:

UNITED STATES PATENTS

| Number | Name | Date |
|---|---|---|
| 2,185,243 | Boese | Jan. 2, 1940 |

OTHER REFERENCES

Zeit. für Angew. Chem., 44, 836 (1931).
Von Pechmann: Berichte, 17, 2391.